Oct. 29, 1940.   G. W. JORDAN   2,219,422
DISPENSING DEVICE
Filed May 10, 1938

Inventor.
George W. Jordan

Patented Oct. 29, 1940

2,219,422

UNITED STATES PATENT OFFICE 2,219,422

DISPENSING DEVICE

George William Jordan, Arlington, Va.

Application May 10, 1938, Serial No. 207,099

6 Claims. (Cl. 206—42)

The object of this invention is to provide a new and useful dispensing device for pellets of substantially uniform size; it being especially adapted to dispense one pill, or shot such as is used in air rifles, at a time.

A further object is to provide a cheap construction with no moving parts to get out of order.

With these objects in view, the invention consists of a construction and arrangement of parts, a preferred embodiment of which is in the following drawing. Continued use in practice, however, may suggest slight changes which will be within the scope of the claims appended hereto. The right is reserved to make such changes as can be made without departing from the spirit of the invention.

Figure 1:
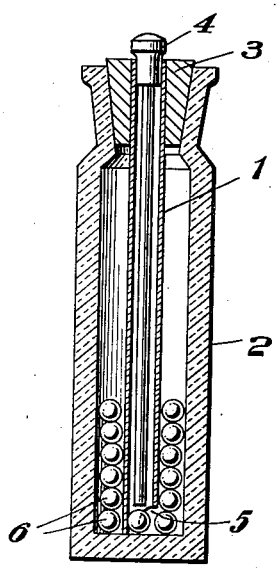
Fig. 1 is a cross-sectional view of the device.
Figure 2:
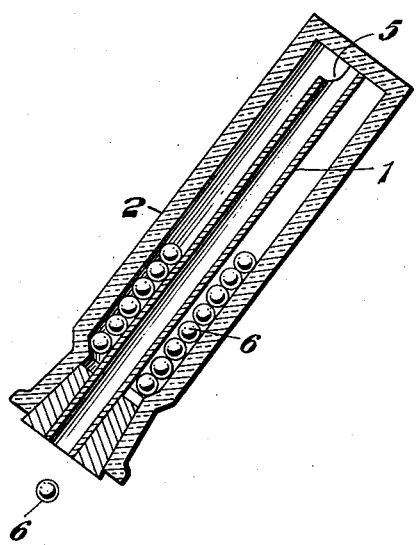
Fig. 2 is a similar view in a different position and with stopper and plunger 4 removed.
Figure 3:
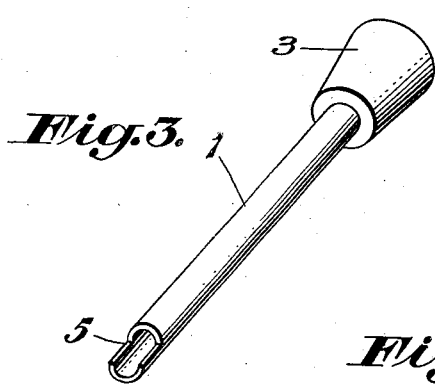
Fig. 3 is a perspective view of tube 1, as shown in Fig. 2, with its lower end in the foreground.
Figure 4:
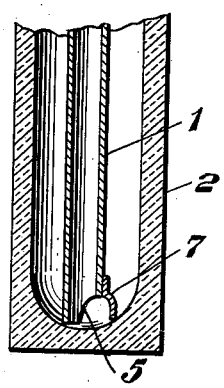
Fig. 4 is a cross-sectional view showing a modified form of the container and with a guard, or deflector 7, attached to tube 1.
Figure 5:
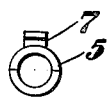
Fig. 5 is an end view of tube 1 as shown in Fig. 4, with the guard, or deflector 7, attached.

This invention consists of a container 2 with a tube 1 passing through one side of said container and extending to the opposite side; an opening 5 on one side of the lower end of said tube to be of such size and shape as to permit only one pellet 6 at a time, to come in position to be discharged; a retaining stopper, or cap, and plunger 4, which, when in place, will prevent tube 1 from filling with the contents of the container while being handled; a larger stopper, or cap, 3 to which tube 1 should be securely engaged at their contact surfaces. To dispense pellet 6, the container is tilted away from opening 5, as shown in Fig. 2. It is apparent that the pellet, in position, will be drawn by gravity down the tube while the remaining pellets will be similarly drawn away from opening 5. When the container is returned to an upright position, the pellets will again return to the lower end, forcing one of them in position at 5 and the operation can then be repeated. As shown in Fig. 4, a container, the bottom of which has a center lower than its outside edges, has two advantages; the first being a positive action toward the center of the tube opening when the container is in an upright position, the second being a more positive deflection away from the tube opening 5 when said container is tilted forward. As shown in Fig. 4 and Fig. 5, a guard, or deflector, soldered, otherwise attached to, or a part of tube 1 and spaced so as to allow one pellet at a time to come in position at opening 5 from either side, the purpose of which is to insure against pellets, other than the one in position, from following through when the container is tilted forward to operate.

Having thus described the invention, I claim:

1. A dispensing container for pills comprising a storage chamber, a discharge tube extending into said storage chamber with the outer, or discharge, end of said tube passing through one of the walls of said chamber and having its inner, or inlet, end at a distance from the opposite wall of less than the diameter of the object to be dispensed, an aperture formed in the side of the discharge tube at its inlet end, the height of said aperture, measured from the adjacent wall of the storage chamber, and also its width, being slightly more than the diameter of the object to be dispensed and less than two diameters, and a retaining plunger extending through said discharge tube to within less than twice the diameter of the object to be dispensed from the adjacent end of the storage chamber.

2. A dispensing container for pills comprising a storage chamber, a discharge tube extending into said storage chamber with the outer, or discharge, end of said tube passing through a stopper fitted to an opening in one of the walls of said chamber and having its inner, or inlet, end at a distance from the opposite wall of less than the diameter of the object to be dispensed, an aperture formed in the side of the discharge tube at its inlet end, the height of said aperture, measured from the adjacent wall of the storage chamber, and also its width, being slightly more than the diameter of the object to be dispensed and less than two diameters, and a retaining plunger extending through said discharge tube to within less than twice the diameter of the object to be dispensed from the adjacent end of the storage chamber.

3. A dispensing container for pills comprising a storage chamber, a discharge tube extending into said storage chamber with the outer, or discharge, end of said tube passing through one of the walls of said chamber and having its inner, or inlet, end at a distance from the opposite wall of less than the diameter of the object to be dispensed, an aperture formed in the side of the discharge tube at its inlet end, the height of said aperture, measured from the adjacent wall of the storage chamber, and also its width, being slightly more than the diameter of the object to be dispensed and less than two diameters, and a retaining plunger formed with an enlarged end fitted to serve as a stopper for the discharge tube, extending through said discharge tube to within less than twice the diameter of the object to be dispensed from the adjacent end of the storage chamber.

4. A dispensing container for pills comprising a storage chamber, a discharge tube greater in internal diameter than the diameter of the object to be dispensed, but less than twice the diameter of said object, which tube extends into said storage chamber with the outer, or discharge, end of said tube passing through one of the walls of said chamber and having its inner, or inlet, end at a distance from the opposite wall of less than the diameter of the object to be dispensed, an aperture formed in the side of the discharge tube at its inlet end, the height of said aperture, measured from the adjacent wall of the storage chamber, and also its width, being slightly more than the diameter of the object to be dispensed and less than two diameters, and a retaining plunger extending through said discharge tube to within less than twice the diameter of the object to be dispensed from the adjacent end of the storage chamber.

5. A dispensing container for pills comprising a storage chamber, a discharge tube extending into said storage chamber with the outer or discharge end of said tube passing through one of the walls of said chamber, and having its inner or inlet end at a distance from the opposite wall of less than the diameter of the object to be dispensed, an aperture formed in the side of the discharge tube at its inlet end, the height of said aperture, measured from the adjacent wall of the storage chamber and also its width, being slightly more than the diameter of the object to be dispensed and less than two diameters, a shield in front of said aperture and a retaining plunger removably placed within the discharge tube and extending through said discharge tube to within a distance of less than twice the diameter of the object to be dispensed from the adjacent wall of the storage chamber.

6. A dispensing device for pills, or the like, comprising a container with an open-ended tube passing through one end thereof and extending to the opposite end, the inside diameter of said tube to be only enough larger than the object to be dispensed so as to permit said object to pass freely through the tube, said tube being provided with an opening formed so as to substantially cut away one half of the tube from the center line at the lower end of the tube to a point on the side of said tube, the opening thus formed in the lower end of the tube being of such size as to permit one pellet to enter the tube, the container for said device having a concave lower inside surface thereby making more positive the action of gravity on the pellets toward, or away from, the lower opening in the discharge tube according to the position of the device, the aforementioned discharge tube being provided with a guard, or deflector, attached to, said tube and extending outwardly and downwardly from a point above the lower opening in said tube and spaced so as to permit one pellet to come into position at said opening from either side, the upper end of said tube being provided with a stopper, or cap, with attached plunger, or retaining rod, which, when inserted in, and secured to said upper end, will prevent the tube from filling with the contents of the container while the device is being handled.

GEORGE W. JORDAN.